United States Patent
Hettish

(12) 
(10) Patent No.: US 6,687,342 B1
(45) Date of Patent: Feb. 3, 2004

(54) SYSTEM AND METHOD FOR RETAINING CLIENT CONFIGURATION INFORMATION ACROSS THE RE-INSTALLATION OF ANY TAPI SERVICE PROVIDER IN A TAPI 2.1 ENVIRONMENT

(75) Inventor: Mark Bernard Hettish, Cary, NC (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/484,578

(22) Filed: Jan. 18, 2000

(51) Int. Cl.[7] ............................................. H04M 11/00
(52) U.S. Cl. .............................. 379/93.05; 379/142.13; 379/142.15; 379/144.05
(58) Field of Search ...................... 379/90.01, 201.01, 379/201.02, 201.03, 201.05, 100.15, 142.13, 142.15, 93.05, 144.05

(56) References Cited

U.S. PATENT DOCUMENTS

| | | | |
|---|---|---|---|
| 5,574,888 A | | 11/1996 | Pandtiji et al. .............. 395/500 |
| 5,815,682 A | * | 9/1998 | Williams et al. .............. 703/25 |
| 5,940,488 A | | 8/1999 | DeGrazia et al. ........... 379/201 |
| 6,343,116 B1 | * | 1/2002 | Quinton et al. .......... 379/90.01 |
| 6,463,078 B1 | * | 10/2002 | Engstrom et al. ........... 370/466 |
| 6,507,588 B1 | * | 1/2003 | Yasuda ....................... 370/463 |

\* cited by examiner

*Primary Examiner*—Bing Bui

(57) ABSTRACT

A TAPI method according to an implementation of the present invention includes installing a TAPI service provider and associating a first PID with the TAPI service provider; re-installing the TAPI service provider and associating a second PID with the TAPI service provider; and automatically associating TAPI devices that had been associated with the first PID with the second PID.

15 Claims, 4 Drawing Sheets

SYSTEM AND METHOD FOR RETAINING CLIENT CONFIGURATION INFORMATION ACROSS THE RE-INSTALLATION OF ANY TAPI SERVICE PROVIDER IN A TAPI 2.1 ENVIRONMENT

BACKGROUND OF THE INVENTION

1. Field of the Invention

The present invention relates to communications systems and, in particular, to a communication system employing a TAPI interface.

2. Description of the Related Art

The Telephony Application Programming Interface (TAPI) is a high level programming interface for Windows™ which supports many types of telephony applications associated with conventional analog public telephone lines, PBX phone lines, ISDN phone lines, and the like. Thus, TAPI allows a communication application to support numerous telephony operations through a variety of mediums by making a function call to TAPI which will drive the hardware (fax/modem card, DSP card, network switch, and the like) coupled thereto.

The TAPI architecture 100 is illustrated in FIG. 1. As shown, the TAPI architecture 100 includes a TAPI implementation 104 interfaced to telephony application programs 102. TAPI 104 provides a connection to a TAPI service provider, such as a TAPI server 106, which then interfaces to hardware such as voices cards 108a, H.323 interfaces 108b, or PBX's 108c.

In TAPI 2.1, for a client to be granted access to be able to control a line or phone, an association must be set up between the client and that line or phone of the TAPI server. The program tcmapp provides this service by generating a configuration file that TAPI 104 then uses when it operates. The program tcmapp is a graphical user interface configuration program that requires manual, line by line entry. The access of a client to lines and phones of a given TAPI service provider 106 is enabled via an association of a provider ID (PID), a client name, and the line or phone itself.

When a TAPI service provider 106 is uninstalled and then reinstalled, the TAPI system 104 assigns the provider a new, random PID. However, the client line associations within the TAPI system 104 still use the old PID as the association key. Since this association no longer exists, when the new TAPI service provider 106 is enabled, all the client associations that were previously there are removed from the TAPI system 104.

In order to reset the client configurations, the tcmapp program must be re-run. Since several thousand lines and phones can be associated with the TAPI service provider, re-entering all lines and phones on a line by line basis can be cumbersome and error prone.

SUMMARY OF THE INVENTION

These and other drawbacks in the prior art are overcome in large part by a system and method for client configuration in a TAPI environment according to the present invention. A TAPI method according to an implementation of the present invention includes installing a TAPI service provider and associating a first PID with the TAPI service provider; re-installing the TAPI service provider and associating a second PID with the TAPI service provider; and automatically associating TAPI devices that had been associated with the first PID with the second PID.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
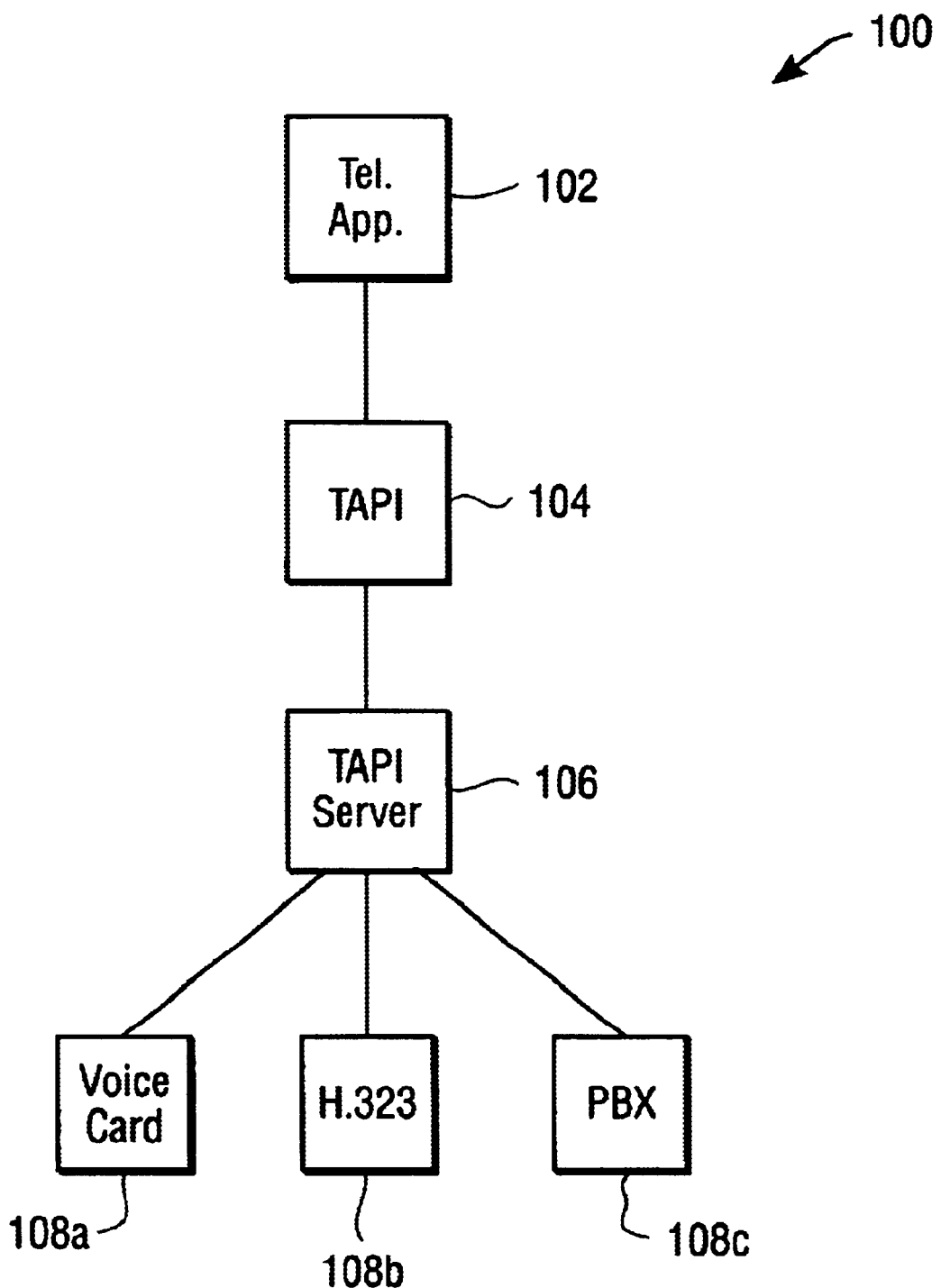
FIG. 1 is a diagram representative of the TAPI architecture.
Figure 2:
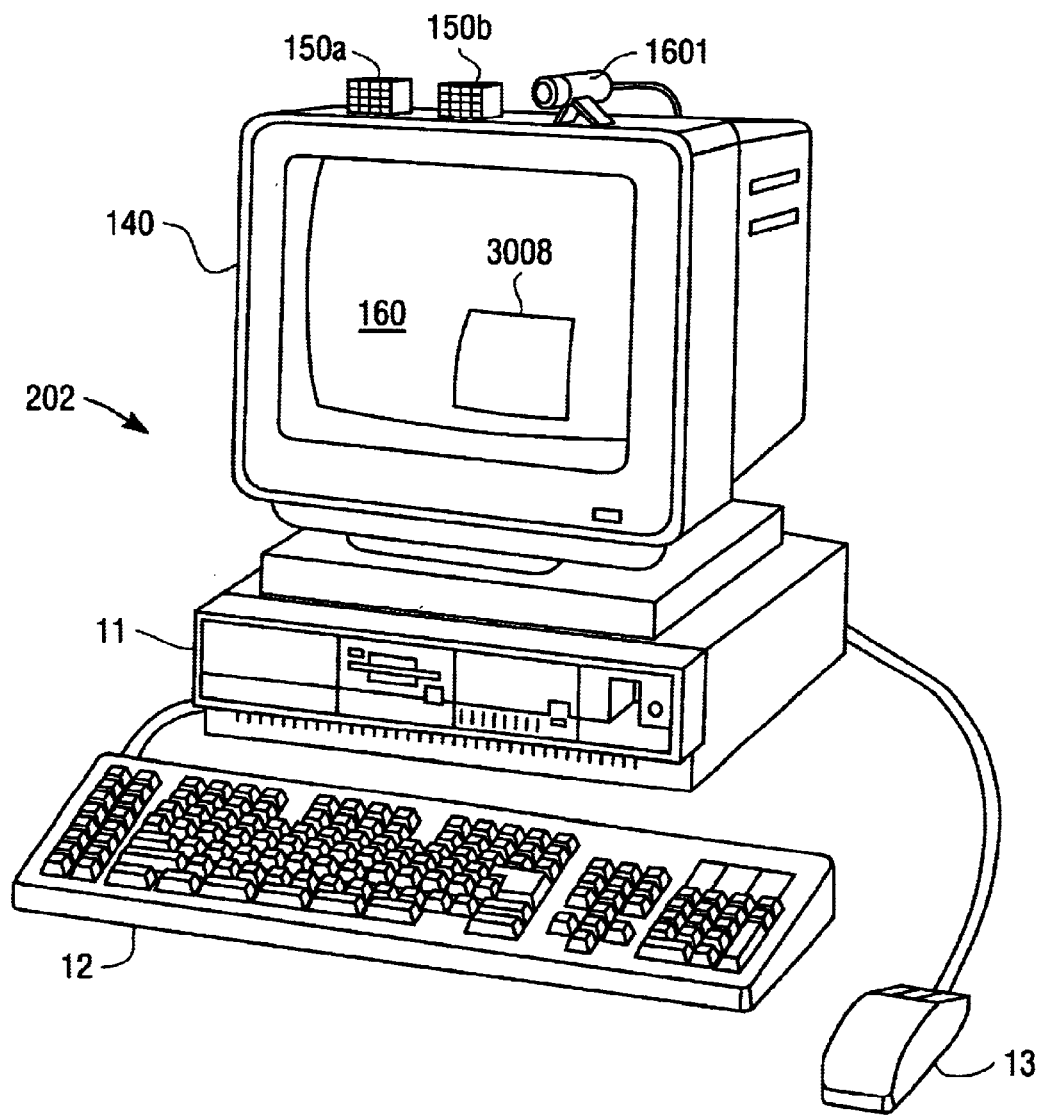
FIG. 2 is a diagram illustrating a computer system employing a TAPI system according to an implementation of the present invention.
Figure 3:
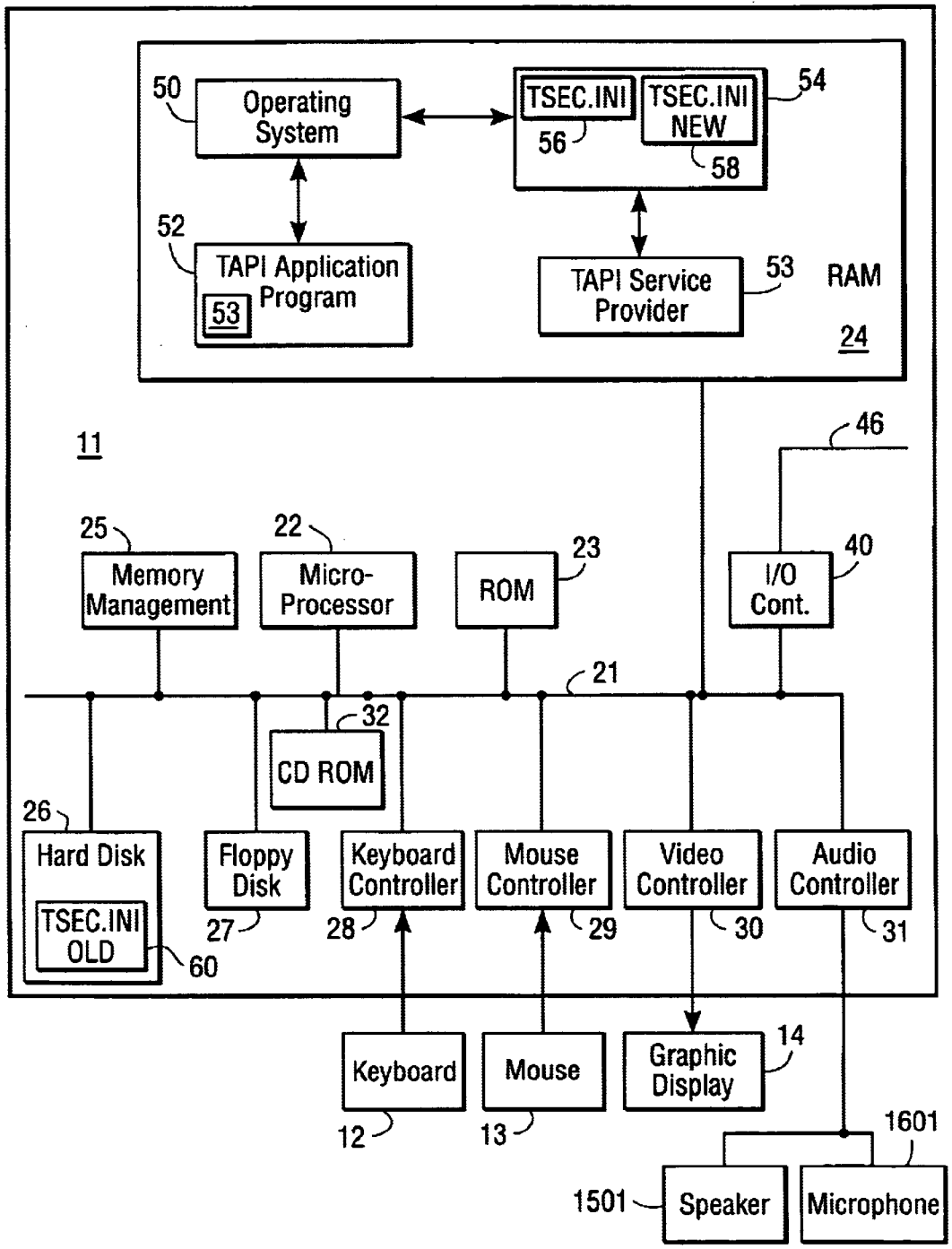
FIG. 3 is a block diagram of the computer system of FIG. 2 according to an implementation of the present invention.
Figure 4:
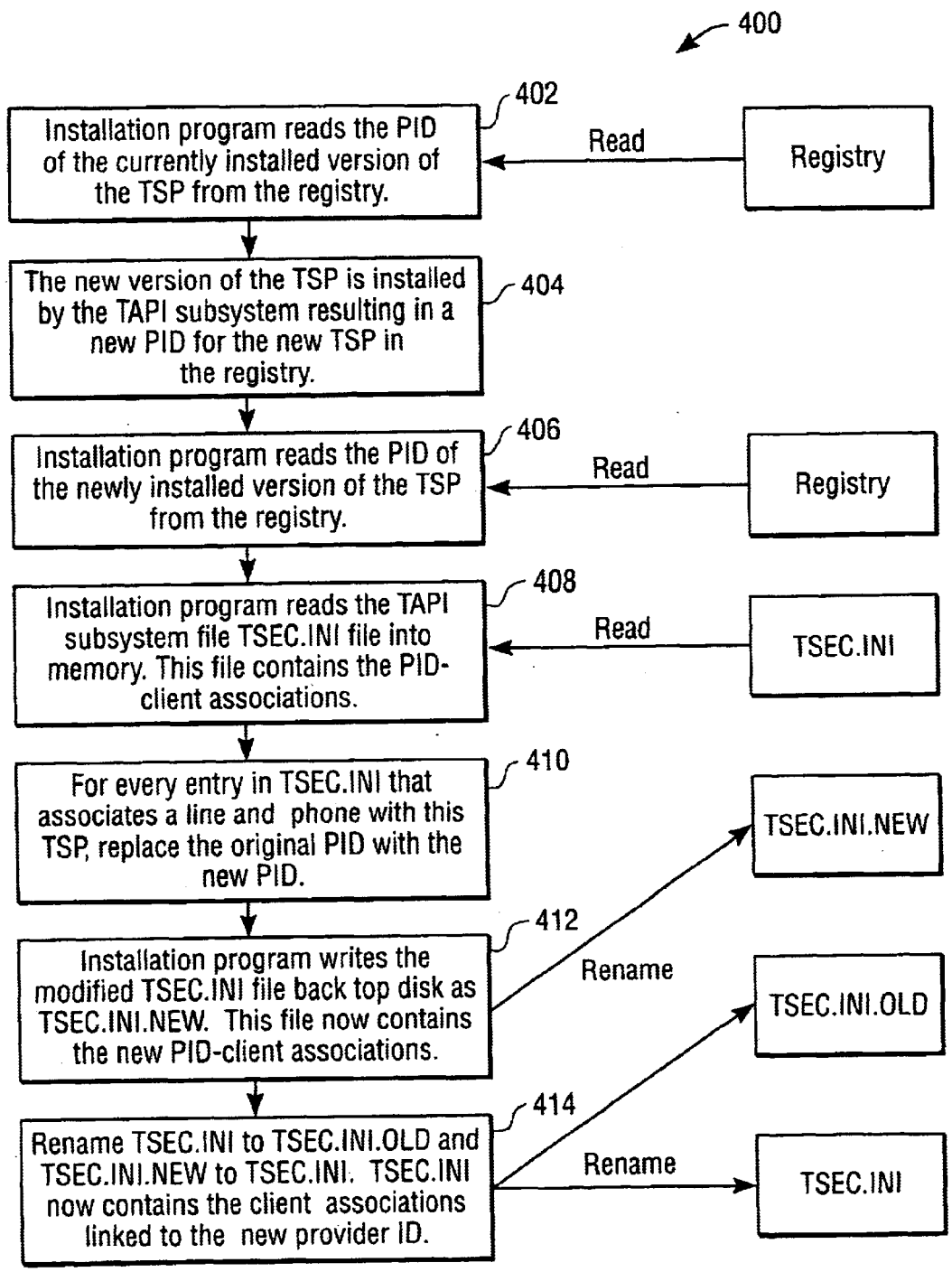
FIG. 4 is a flowchart illustrating operation of an implementation of the invention.

FIGS. 2–4 illustrate an improved system and method for client configuration in a TAPI environment. A TAPI method according to an implementation of the present invention includes installing a TAPI service provider and associating a first PID with the TAPI service provider; re-installing the TAPI service provider and associating a second PID with the TAPI service provider; and automatically associating TAPI devices that had been associated with the first PID with the second PID.

An exemplary TAPI client 202 is shown in FIG. 2. The TAPI client 202 may be embodied as a personal computer, including a system unit 11, a keyboard 12, a mouse 13, and a display 140. Also shown are one or more speakers 150a, 150b, and a microphone 1601. The screen 160 of the display device 14 is used to present a graphical user interface (GUI) and particularly, a TAPI client window 3008. The graphical user interface supported by the operating system allows the user to employ a point and click method of input, i.e., by moving the mouse pointer or cursor (not shown) to an icon representing a data object at a particular location on the screen 160 and pressing one or more of the mouse buttons to perform a user command or selection. The GUI may be any of the Windows GUIs available from Microsoft Corporation or the Macintosh OS, available from Apple Computer.

FIG. 3 shows a block diagram of the components of the personal computer shown in FIG. 2. The system unit 11 includes a system bus or a plurality of system buses 21 to which various components are coupled and by which communication between the various components is accomplished. The microprocessor 22 is coupled to the system bus 21 and is supported by the read only memory (ROM) 23 and the random access memory (RAM) 24 also connected to the system bus 21. The microprocessor 22 may be embodied as any of a variety of microprocessors, including Intel x86, Pentium or Pentium II or compatible processors.

The ROM 23 contains, among other code, the basic input output system (BIOS) which controls basic hardware operations such as the interaction of the disk drives and the keyboard. The RAM 24 is the main memory into which the operating system and applications programs are loaded. The memory management chip 25 is connected to the system bus 21 and controls direct memory access operations including passing data between the RAM 24 and hard disk drive 26 and floppy disk drive 27. A CD ROM drive (or DVD or other optical drive) 32 may also be coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13; the video controller 30 is the hardware interface for the video display 14; and the audio controller 31 is the hardware interface for the speakers 15 and microphone 16. The speakers 150a, b and the microphone 1601 allow for audio communication during telephony operation. In operation, keyboard strokes are detected by the keyboard controller 28 and corresponding signals are transmitted to the microprocessor 22; similarly, mouse movements and button clicks are detected by the mouse controller and provided to the microprocessor 22. Typically, the keyboard controller 28 and the mouse controller 29 assert interrupts at the microprocessor 22. In response, the microprocessor 22 executes a corresponding interrupt routine, as is known. Additionally, an interrupt controller (not shown) may be provided to arbitrate among interrupt requests.

An I/O controller or network interface 40 enables communication over a network 46, such as a packet network. More particularly, the I/O controller 40 may be an H.323 Recommendation interface, to allow for telephony or multimedia communications, or may be any other telephony interface.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, or a floppy disk for use in the floppy disk drive 27.

As shown in the figure, the operating system 50, the TAPI application 52, including an installation program 55, and the TSEC.INI file 56 are resident in the RAM 24. Also shown is a TSEC.INI.NEW file 58, to which the TSEC.INI file is renamed, as will be explained in greater detail below. As is known, the operating system 50 functions to generate a graphical user interface on the display 14. The TAPI application program 52 performs TAPI functionality, including generation of a TAPI client window 3008 (FIG. 2) in the GUI.

As is known, upon installation of a TAPI service provider, such as a API server, the TAPI application program 52 generates a new provider identification (PID) and saves it in the system registry (not shown). When clients associated with the TAPI service provider are configured, the TAPI application program 52 associates the clients and the TAPI service provider in the TSEC.INI file 56 according to the PID, which is accessed from the system registry.

According to the present invention, PID associations are saved when a TAPI service provider is installed. Then, when the TAPI service provider is re-installed, the old PID associations are automatically updated with the new PID associations. Further, according to one implementation of the invention, the previous TSEC.INI file is saved or renamed as TSEC.INI.OLD, with the new TSEC.INI file being archived as TSEC.INI.NEW.

Turning now to FIG. 4, a flowchart illustrating operation of an embodiment of the invention is shown. In a step 402, the installation program 55 reads the PID of the currently installed version of the TAPI service provider 53 from the registry (not shown). Next, in a step 404, a new version of the TAPI service provider 53 is installed by the installation program 55. The TAPI system 52 assigns a new PID for the new installation of the TAPI service provider 53. The new PID, like the old PID, is stored in the system registry.

In a step 406, the installation program 55 reads the PID of the newly-installed version of the TAPI service provider 53 from the registry. Next, the installation program 55 reads the TSEC.INI file into memory. The TSEC.INI file contains the PID-client associations. In step 410, the installation program 55 replaces the original PID with the new PID for every entry in the TSEC.INI file that associates a line and a phone with the TAPI service provider 53 that is being re-installed.

In step 412, the installation program 55 writes the modified TSEC.INI file back to the hard disk as TSEC.INI.NEW (or other indicia that the file is new) 58. The file TSEC.INI.NEW 58 now contains the new PID associations. Next, in a step 414, the existing file TSEC.INI is renamed to TSEC.INI.OLD (or other indicia that this is the old file) 60, and the new file, TSEC.INI.NEW 58, is renamed as TSEC.INI. The new TSEC.INI file now contains the client associations linked to the new PID.

APPENDIX

```
#include <afxwin.h>
#include <afxext.h>
#include "su.h"
#include "tapi.h"
#include "tspi.h"
#include "mu_devls.h"
#include "mdb_opti.h"
#include "mdb_tdat.h"
#include "mdb_siem.h"
#include "mdb_tobj.h"
#include "mdb_mgrs.h"
#include "mdb_mdb.h"
#include "ti_dbapi.h"
#include "ti_build.h"
#include "su_shdat.h"
#include "cdb_main.h"
#include "su_tcorr.h"
#include "ti_intf.h"
#include "sh_stats.h"
#include "ugglobal.h"
#include "ugerror.h"
#include "sh_pl_ad.h"
#include "plglobal.h"
#include "pl_drvr.h"
#include "pl_thrds.h"
#include "ositcp.h"
```

APPENDIX-continued

```
#include "pl_link.h"
#include "hicommsg.h"
#include "oss_acl.h"
#include "oss_csta.h"
#include "mp_defs.h"
#include "rr_platf.h"
#include "rr_inc.h"
#include "pl_tsec.h"
DEFINESOURCEINFO;
HANDLE cb_device_list_done_semaphore = NULL;
HANDLE cb_TSP_load_state_semaphore = NULL;
HANDLE cb_config_change_request_semaphore = NULL;
HANDLE cb_config_change_ack_semaphore = NULL;
HANDLE cb_read_config_db_semaphore = NULL;
HANDLE cb_device_list_update_request_semaphore = NULL;
HANDLE cb_device_list_update_ack_semaphore = NULL;
HANDLE cb_log_file_size_change_semaphore = NULL;
HANDLE cb_acl_request_semaphore = NULL;
HANDLE cb_link_down_semaphore = NULL;
HANDLE cb_cntrl_thrd_term_semaphore = NULL;
HANDLE cb_throttle_semaphore = NULL;
USHORT threadCount = 0;
BOOL thread_exit_flag = FALSE;
BOOL internal_TSP_state = FALSE;
LINK_DOWN_REASON reason_for_link_down = INITIALIZING;
HANDLE event_thread_h = NULL;
HANDLE control_thread_h = NULL;
HANDLE calc_thread_h = NULL;
HANDLE device_update_thread_h = NULL;
HANDLE link_down_thread_h = NULL;
RET_CODE init_TSP( )
{
    RET_CODE rc = GOOD;
    CString err_str;
    int wait_status = 0;
    BOOL wait_for_dev_list = FALSE;
    BOOL debug_on = FALSE;
    cnfg_db & config_db = get_cnfg_db( );
    if( (config_db.validate( ) == CNFG_DB_RC_GOOD) &&
        (config_db.debug_tracing_on (DBG_PLATFORM_BIT)))
    {
        su_log_message(0, SU_DEBUG, SU_TRACE_NONE,
                        0, NULL, SOURCENAME, __LINE__,
                        0, 0, NULL,
                        L "Enter init_TSP");
        debug_on = TRUE;
    }
        thread_exit_flag = 0;
        rc = db_init( );
    c_stats_db & stats_db = get_stats_db( );
    if ( rc == GOOD)
    {
        rc = sem_init( );
    }
    if ( rc == GOOD)
    {
        rc = osi_startup( );
        if ( rc != GOOD)
        {
            rc = ERR_NUM_PL_PI_INIT_FAILED;
        }
    }
    if (rc == GOOD)
    {
            stats_db.clear_stats( );
        stats_db.misc_stats_ptr->config_change_status = CCS_IDLE;
        stats_db.misc_stats_ptr->device_update_status = DUS_IDLE;
        if (provider_install_called == TRUE)
        {
            reason_for_link_down = INITIALIZING;
            wait_for_dev_list = TRUE;
        }
        else
        {
                rc =
mp_get_acl_devices_list(CHECK_DEVLIST_REQUEST);
            if( rc == GOOD)
            {
                reason_for_link_down = NORMAL;
```

APPENDIX-continued

```
            }
            else
            {
                reason_for_link_down = INITIALIZING;
                wait_for_dev_list = TRUE;
            }
        }
        rc = spawn_threads( );
    }
    if ( rc == GOOD)
    {
        if( wait_for_dev_list == TRUE)
        {
            wait_status =
WaitForSingleObject(cb_device_list_done_semaphore,
                                        DEVICE_DOWNLOAD_TIME);
            if( wait_status != WAIT_TIMEOUT)
            {
                if( device_list_updated == TRUE)
                {
                    init_good( );
                }
                else
                {
                    rc = ERR_NUM_PL_PI_INIT_FAILED;
                }
            }       else
            {
                rc = ERR_NUM_PL_PI_INIT_FAILED;
                err_str = L"Timedout waiting for Device List to be downloaded";
                su_log_message(0,SU_ERROR,SU_TRACE_NONE,
                            0,L" ",
                            SOURCENAME,_LINE_,
                            rc,0,NULL,err_str);
            }
        }
        else
        {
            init_good( );
        }
    }
    if( provider_install_called == TRUE)
    {
        if ( rc != GOOD)
        {
            su_log_message(IDS_TSP_ADD_FAILED, SU_INFORMATION,
SU_TRACE_NONE,
                    0, NULL, SOURCENAME, _LINE_,
                    0, 0, NULL, NULL);
        }
        else
        {
            su_log_message(0, SU_DEBUG, SU_TRACE_NONE,
                    0, NULL, SOURCENAME, _LINE_,
                    0, 0, NULL, L "TSP was ADDed successfully");
            CTsecModifier tsecMod;
            tsecMod.ConvertTsecFile( );
        }
        shutdown_TSP( ):
        provider_install_called = FALSE;
    }
    else
    {
        if ( rc != GOOD)
        {
            su_log_message( IDS_TSP_INIT_FAILED, SU_INFORMATION,
SU_TRACE_NONE,
                    0, NULL, SOURCENAME, _LINE_,
                    0, 0, NULL, NULL);
            shutdown_TSP( );
        }
        else
        {
            su_log_message( IDS_TSP_INIT_SUCCESS, SU_INFORMATION,
SU_TRACE_NONE,
                    0, NULL, SOURCENAME, _LINE_,
                    0, 0, NULL, NULL);
        }
```

APPENDIX-continued

```
        }
        if( debug_on)
        {
            su_log_message(0,SU_DEBUG, SU_TRACE_NONE,
                    0, NULL, SOURCENAME, __LINE__,
                    0, 0, NULL,
                    L "Exit init_TSP");
        }
        return(rc);
}
#include <stdafx.h>
#include "tg_paths.h"
#include "verbose.h"
#include "pl_tsec.h"
DEFINESOURCEINFO;
int DebugOn = 1;
CTsecModifier::CTsecModifier (void)
{
    ProviderID = 0;
    TsecFilePtr = NULL;
    NewTsecFile = NULL;
    TsecFileMap = NULL;
    WinntDir[0] = 0;
}
CTsecModifier::~CTsecModifier (void)
{
}
void CTsecModifier::ConvertTsecFile( )
{
    BOOL error_found = FALSE;
    error_found = InitTsec( );
    if (error_found == FALSE)
    {
        error_found = GetProviderID( );
    }
    if (error_found == FALSE)
    {
        error_found = OpenTsecFile( );
    }
    if (error_found == FALSE)
    {
        error_found = ProcessTsecInfo( );
    }
    if (error_found == FALSE)
    {
        error_found = WrapupTsec( );
    }
}
BOOL CTsecModifier::InitTsec( )
{
    BOOL error_found = FALSE;
    UINT result = 0;

result = GetWindowsDirectory(WinntDir, MAX_PATH);
    if (result == 0 || result >= MAX_PATH)
    {
        error_found = TRUE;
        verbose (_T("Error in calling GetWindowsDirectory"),
                SOURCENAME, __LINE__);
    }
    return(error_found);
}
BOOL CTsecModifier::GetProviderID( )
{
    LONG regResult = 0;
    HKEY hKey;
    DWORD valueLen = 0;
    BOOL error_found = FALSE;
    regResult = REgOpenKeyEx (HKEY_LOCAL_MACHINE, PROVIDERS_PATH, 0,
            KEY_READ, &hKey);
    if (regResult == ERROR_SUCCESS)
    {
        valueLen = size of (ProviderID);
        regResult = RegQueryValueEx (hKey, _T("NextProviderID"),
NULL, NULL,
                (LPBYTE) &ProviderID, &valueLen);
        if (regResult == ERROR_SUCCESS)
        {
            ProviderID--;
```

APPENDIX-continued

```
            }
            else
            {
                error_found = TRUE;
                verbose (_T("Error when getting provider id"),
SOURCENAME, _LINE_);
            }
        }
    }
    else
    {
        error_found = TRUE;
        verbose (_T("Error in open registry"), SOURCENAME, _LINE_);
    }
    return (error_found);
}
BOOL CTsecModifier::OpenTsecFile( )
{
    BOOL error_found = FALSE;
    BOOL openResult = FALSE;
    CFileException e;
    TCHAR outFileName[MAX_CHAR];
    TCHAR inFileName[MAX_CHAR];
    _stprintf(outFileName, _T("%s\\%s"), WinntDir, TSEC_FILE_NEW);
    NewTsecFile = _tfopen(outFileName, _T("w"));
    if (NewTsecFile != NULL)
    {
        _stprintf(inFileName, _T("%s\\%s"), WinntDir, TSEC_FILE_INI);
        openResult = CurrentTsecFile.Open(inFileName,
CFile::modeRead, &e);
        if (openResult == TRUE)
        {
            TsecFileMap = CreateFileMapping((HANDLE)
CurrentTsecFile.m_hFile,
                NULL, PAGE_READONLY, 0, 0, NULL);
            if (TsecFileMap != NULL)
            {
                TsecFilePtr = (char *) MapViewOfFile(
                    TsecFileMap, FILE_MAP_READ, 0, 0, 0);
                if (TsecFilePtr == NULL)
                {
                    error_found = TRUE;
                    verbose (_T("Error in mapping the view"),
                        SOURCENAME, _LINE_);
                    CloseHandle(TsecFileMap);
                    CurrentTsecFile.Close( );
                }
            }
            else
            {
                error_found = TRUE;
                verbose (_T("Error in creating mapping file"),
                    SOUCENAME, _LINE_);
                CurrentTsecFile.Close( );
            }
        }
        else
        {
            error_found = TRUE;
            verbose (_T("Error in opening input file"),
                SOURCENAME, _LINE_);
        }
        if (error_found == TRUE)
        {
            fclose(NewTsecFile);
        }
    }
    else
    {
        error_found = TRUE;
        verbose (_T("Error in opening output file"),
            SOURCENAME, _LINE_);
    }
    return(error_found);
}
BOOL CTsecModifier::ProcessTsecInfo( )
{
    BOOL error_found = FALSE;
    int result = 0;
    char token [MAX_CHAR];
```

APPENDIX-continued

```
    BOOL add_comma = TRUE;
    BOOL read_provider_id = TRUE;
    char *ptr;
    ptr = TsecFilePtr;
    while (*ptr != NULL && error_found == FALSE)
    {
        result = strcspn (ptr, TOKEN_STRING);
        if (result == 0)
        {
            error_found = TRUE;
            verbose (_T("Nothing from token"), SOURCENAME, _LINE_);
            break;
        }
        strncpy(token, ptr, result);
        token[result] = 0;
        if (token[0] == '[')
        {
            fprintf(NewTsecFile, "%s", token);
        }
        else if ((!strcmp (token, "lines") || !strcmp(token,
"phones")))
        {
            fprintf(NewTsecFile, "%s=", token);
            add_comma = FALSE;
        }
        else if (read_provider_id == TRUE)
        {
            fprintf(NewTsecFile,
                (add_comma == TRUE) ? ",%1d":"%1d", ProviderID);
            read_provider_id = FALSE; // next time, read the line
number field
            add_comma = TRUE;
        }
        else
        {
            fprintf(NewTsecFile, ",%s", token);
            read_provider_id = TRUE;
        }
        if (*(ptr + result) == '\r')
        {
            ptr += result + 2;
            fprintf(NewTsecFile, "\n");
        }
        else
        {
            ptr += result + 1;
        }
        if (*ptr == '\r')
        {
            ptr += 2;
            fprintf(NewTsecFile, "\n");
        }
    }
    return(error_found);
}
BOOL CTsecModifier::WrapupTsec( )
{
    BOOL error_found = FALSE;
    TCHAR tsecFileOld[MAX_CHAR];
    TCHAR tsecFileNew[MAX_CHAR];
    TCHAR tsecFileIni[MAX_CHAR];
    int result = 0;
    BOOL close_result = FALSE;
    _stprintf(tsecFileOld, _T("%s\\%s"), WinntDir, TSEC_FILE_OLD);
    _stprintf(tsecFileNew, _T("%s\\%s"), WinntDir, TSEC_FILE_NEW);
    _stprintf(tsecFileIni, _T("%s\\%s"), WinntDir, TSEC_FILE_INI);
    result = fclose(NewTsecFile);
    if (result != 0)
    {
        error_found = TRUE;
        verbose (_T("Error in closing file"),
            SOURCENAME, _LINE_);
    }
    close_result = UnmapViewOfFile(TsecFilePtr);
    if (close_result == FALSE)
    {
        error_found = TRUE;
        verbose (_T("Error in unmapping view"),
            SOURCENAME, _LINE_);
```

APPENDIX-continued

```
    }
    close_result = CloseHandle(TsecFileMap);
    if (close_result == FALSE)
    }
        error_found = TRUE;
        verbose (_T("Error in closing file"),
            SOURCENAME, __LINE__);
    }
    CurrentTsecFile.Close( );
    if (error_found == FALSE)
    {
        result = _tremove(tsecFileOld);
        result = _trename(tsecFileIni, tsecFileOld);
        if (result == 0)
        {
            result = _trename(tsecFileNew, tsecFileIni);
            if (result != 0)
            {
                error_found = TRUE;
                verbose (_T("Error in renaming file"),
                    SOURCENAME, __LINE__);
            }
        }
        else
        {
            error_found = TRUE;
            verbose (_T("Error in renaming file"),
                SOURCENAME, __LINE__);
        }
    }
    return(error_found);
}
#define MAX_CHAR 100
#define TOKEN_STRING ",=\r\n"
#define PROVIDERS_PATH
_T("SOFTWARE\\Microsoft\\Windows\\CurrentVersion\\
Telephony\\Providers")
class CTsecModifier
{
public:
    CTsecModifier (void);
    ~CTsecModifier (void);
    void ConvertTsecFile(void);
private:
    long        ProviderID;
    char        *TsecFilePtr;
    FILE        *NewTsecFile;
    CFile       CurrentTsecFile;
    HANDLE      TsecFileMap;
    TCHAR       WinntDir[MAX_PATH];
    BOOL InitTsec(void);
    BOOL GetProviderID(void);
    BOOL OpenTsecFile(void);
    BOOL ProcessTsecInfo(void);
    BOOL WrapupTsec(void);
};
#endif
```

What is claimed is:

1. A Telephony Application Programming Interface (TAPI) method, comprising:
   installing a TAPI service provider, said installing including associating a first provider ID (PID) with said TAPI service provider;
   re-installing said TAPI service provider, said re-installing including associating a second PID with said TAPI service provider; and
   automatically associating TAPI devices that had been associated with said first PID with said second PID.

2. A TAPI method in accordance with claim 1, said automatically associating comprising replacing occurrences of said first PID with said second PID in an initialization file.

3. A TAPI method in accordance with claim 2, further comprising replacing a first initialization file with an updated initialization file and saving an archive copy of said first initialization file.

4. A Telephony Application Programming Interface (TAPI) method, comprising:
   re-installing a TAPI service provider, said re-installing including associating a first provider ID (PID) with said TAPI service provider; and
   automatically associating TAPI devices that had been associated with a prior PID from a previous installation of said TAPI service provider with said first PID.

5. A TAPI method in accordance with claim 4, said automatically associating comprising replacing occurrences of said prior PID with said first PID in an initialization file.

6. A TAPI method in accordance with claim 5, further comprising replacing a first initialization file with an updated initialization file and saving an archive copy of said first initialization file.

7. A Telephony Application Programming Interface (TAPI) system, comprising:

means for installing a TAPI service provider, said installing means including means for associating a first provider ID (PID) with said TAPI service provider;

means for re-installing said TAPI service provider, said re-installing means including means for associating a second PID with said TAPI service provider; and means for automatically associating TAPI devices that had been associated with said first PID with said second PID.

8. A TAPI system in accordance with claim 7, said automatically associating means comprising means for replacing occurrences of said first PID with said second PID in an initialization file.

9. A TAPI system in accordance with claim 8, further comprising means for replacing a first initialization file with an updated initialization file and saving an archive copy of said first initialization file.

10. A Telephony Application Programming Interface (TAPI) system, comprising:

means for re-installing a TAPI service provider, said re-installing means including means for associating a first provider ID (PID) with said TAPI service provider; and means for automatically associating TAPI devices that had been associated with a prior PID from a previous installation of said TAPI service provider with said first PID.

11. A TAPI system in accordance with claim 10, said automatically associating means comprising means for replacing occurrences of said prior PID with said first PID in an initialization file.

12. A TAPI system in accordance with claim 11, further comprising means for replacing a first initialization file with an updated initialization file and saving an archive copy of said first initialization file.

13. A Telephony Application Programming Interface (TAPI) system, comprising:

at least one processor programmed to reinstall a TAPI service provider and associate a first provider ID (PID) with said TAPI service provider;

said at least one processor further programmed to automatically associate TAPI devices that had been associated with a prior PID from a previous installation of said TAPI service provider with said first PID.

14. A TAPI system in accordance with claim 13, said at least one processor programmed to replace occurrences of said prior PID with said first PID in an initialization file.

15. A TAPI system in accordance with claim 14, said at least one processor programmed to replace a first initialization file with an updated initialization file and saving an archive copy of said first initialization file.

* * * * *